United States Patent [19]

Zeuner et al.

[11] Patent Number: 5,501,152
[45] Date of Patent: Mar. 26, 1996

[54] AIR BAG GAS GENERATOR WITH SPONTANEOUS IGNITION AGENT

[75] Inventors: Siegfried Zeuner, München; Hans-Peter Ruge, Vaterstetten; Peter Neukirchinger, München, all of Germany

[73] Assignee: Temic Bayern-Chemie Airgab GmbH, Munich, Germany

[21] Appl. No.: 175,300

[22] Filed: Dec. 29, 1993

[30] Foreign Application Priority Data

Jan. 23, 1993 [DE] Germany .......................... 43 01 794.0

[51] Int. Cl.$^6$ .................................................. C06B 45/00
[52] U.S. Cl. ........................... 102/292; 102/289; 102/290
[58] Field of Search ..................................... 102/290, 292, 102/289

[56] References Cited

U.S. PATENT DOCUMENTS

| | | |
|---|---|---|
| 4,561,675 | 12/1985 | Adams . |
| 4,798,142 | 1/1989 | Canterberry et al. .................. 102/290 |
| 5,024,160 | 6/1991 | Canterberry ............................ 102/323 |
| 5,062,365 | 11/1991 | Canterberry ............................ 102/322 |
| 5,403,036 | 4/1995 | Zakula et al. ..................... 102/202.5 X |

FOREIGN PATENT DOCUMENTS 3914690  11/1989  Germany .

*Primary Examiner*—Peter A. Nelson
*Attorney, Agent, or Firm*—McGlew and Tuttle

[57] ABSTRACT

A spontaneous ignition agent for an air bag gas generator with excellent temperature resistance comprises essentially nitrocellulose, an inorganic oxidizing agent, and carbon.

12 Claims, 2 Drawing Sheets

AIR BAG GAS GENERATOR WITH SPONTANEOUS IGNITION AGENT

FIELD OF THE INVENTION

The present invention pertains to an air bag gas generator with a spontaneous ignition agent which ignites at a temperature that is markedly higher than a normal ambient temperature but substantially lower than the ignition temperature of propellant provided in the gas generator.

BACKGROUND OF THE INVENTION

Such gas generators have been known (cf. U.S. Pat. No. 4,561,675 and DE 39,14,690 A1). At ambient temperatures of about 150° to 200° C., which may occur, e.g., in the case of a fire, the spontaneous ignition agent leads to ignition of the propellant and thus to release of the air bag. The generator housing, which consists, in general, of aluminum or another similar lightweight material, still has sufficient strength at these temperatures. Fragmentation of the housing during the release of the air bag in the case of fire is thus prevented.

According to U.S. Pat. No. 4,561,675 and DE 39,14,690 A1, gun powder, i.e., nitrocellulose, is used as the spontaneous ignition agent, possibly in conjunction with other organic nitro compounds.

An air bag gas generator, including the spontaneous ignition agent, is required to remain able to function over a period of 400 hours under a temperature load of up to 110° C. Such peak temperatures may occur, e.g., during prolonged exposure to direct sunlight. However, nitrocellulose is decomposed during prolonged heating. The requirement is therefore not met by the prior-art spontaneous ignition agents.

SUMMARY AND OBJECTS OF THE INVENTION

It is an object of the present invention is to provide a spontaneous ignition agent for air bag gas generators, which remains stable even during prolonged heating to relatively high temperatures.

According to the invention, an air bag gas generator is provided with a spontaneous ignition agent. The ignition agent ignites at a temperature that is markedly higher than a normal ambient temperature, but is substantially lower than an ignition temperature of propellant positioned in the gas generator. This spontaneous ignition element is formed of a mixture of nitrocellulose, an inorganic oxidizing agent, carbon and possibly another fuel for the inorganic oxidizing agent wherein the percentage of nitrocellulose ranges from 20 to 70 wt. % and the percentage of carbon is at least 3 wt. %. The percentage of nitrocellulose in the spontaneous ignition agent is preferably 30 to 50 wt. %. The percentage of carbon in the ignition agent is preferably 5 to 20 wt. %. The oxidizing agent is an alkali or alkaline earth nitrate, chlorate, perchlorate, or peroxide. The oxidizing agent may also be potassium nitrate and the percentage of potassium nitrate relative to the mixture of potassium nitrate, carbon and other fuel is 7 to 85 wt. %.

Preferably the spontaneous ignition agent is designed as a tablet and the spontaneous ignition agent is arranged on an inside of the combustion chamber housing.

It was found, completely as a surprise, that the abovementioned requirement is met if carbon and an inorganic oxidizing agent reacting with carbon are added to the nitrocellulose. The percentage of nitrocellulose in the spontaneous ignition agent is 20 to 70 wt. %, preferably 30 to 50 wt. %, and especially ca. 40 wt. %.

Especially alkali nitrates, such as potassium or sodium nitrate, may be used as the inorganic oxidizing agents. Alkali chlorates and perchlorates are also suitable for use as oxidizing agents, as are peroxides, especially alkaline-earth peroxides, such as barium peroxide.

Carbon is of particular significance for the heat stabilization of nitrocellulose in the spontaneous ignition agent according to the present invention. Finely ground carbon, such as charcoal, carbon black, or other carbon-containing, powdered materials may be used as the carbon. The percentage of carbon in the spontaneous ignition agent according to the present invention shall be at least 3 wt. %, but the percentage of carbon is preferably 5 to 20 wt. %, relative to the total weight of the spontaneous ignition agent. Besides carbon, other fuels, which can be brought to react with the inorganic oxidizing agent, e.g., sulfur or organic compounds, such as sugar or cellulose, may also be present in the spontaneous ignition agent.

A spontaneous ignition agent that consists of a mixture of nitrocellulose and sulfur-free black blasting powder, in which the weight ratio of nitrocellulose to sulfur-free black blasting powder ranges from 0.5:1 to 0.8:1, proved to be particularly suitable.

The sulfur-free black blasting powder preferably consists of 70 to 85 wt. % potassium nitrate and 30 to 15 wt. % carbon, and especially of ca. 80 wt. % potassium nitrate and ca. 20 wt. % carbon.

However, it is also possible to use sulfur-containing black blasting powder consisting of ca. 75 wt. % potassium nitrate, 10 wt. % sulfur and 15 wt. % carbon. The spontaneous ignition agent according to the present invention, consisting essentially of a mixture of nitrocellulose, carbon and an oxidizing agent, as well as possibly another fuel for the inorganic oxidizing agent (besides carbon), can be pressed very readily into tablets, pellets, or similar other lumpy bodies, or can be shaped otherwise.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

The present invention will be explained in greater detail below on the basis of a comparative example and an example according to the invention.

COMPARATIVE EXAMPLE

Figure 1:
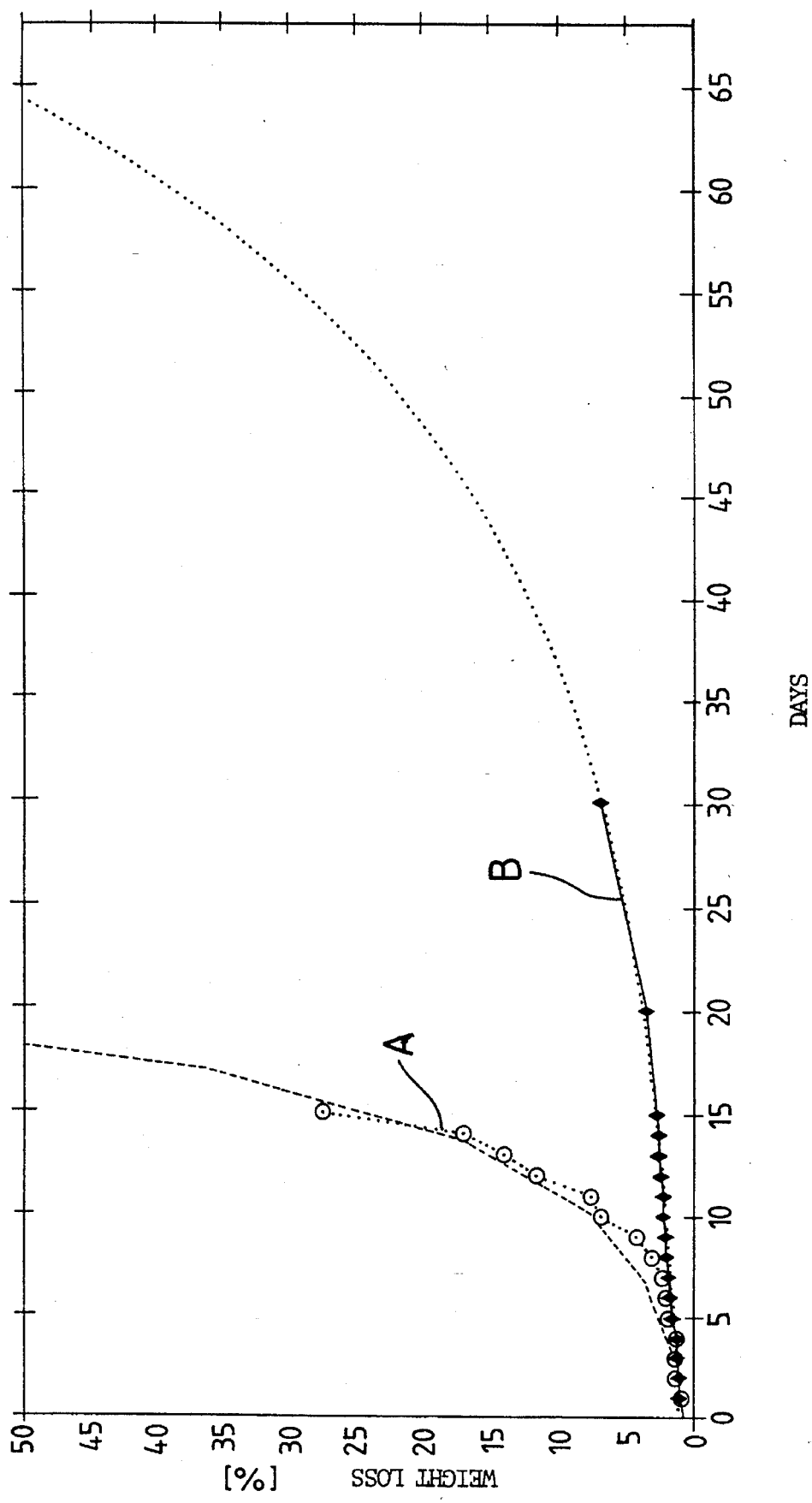
FIG. 1 is a diagram showing the weight loss over days according to the invention and according to a comparative example.

Monobasic, pure nitrocellulose powder (smokeless propellant powder) was stored in air at 105° C. The weight loss of nitrocellulose was measured daily. The results of these measurements are represented by curve A in the diagram enclosed (FIG. 1).

EXAMPLE

The same nitrocellulose powder as in the Comparative Example was mixed with sulfur-free black blasting powder (with the composition of 80 wt. % potassium nitrate and 20 wt. % carbon) at a ratio of 0.66:1. The mixture was stored in air at 105° C., and the weight loss was measured daily. The results of the measurements are represented by curve B in the enclosed diagram (FIG. 1).

As is apparent from the diagram, the weight loss of pure nitrocellulose (curve A) reached ca. 30% after 15 days (360 hours) and even ca. 50% after 17 days (408 hours) due to the formation of gaseous decomposition products. This means that the ability to function of a gas generator containing nitrocellulose as the spontaneous ignition agent decreases very rapidly. In contrast, a weight loss of only ca. 7% occurred in the spontaneous ignition agent according to the present invention even after heating for 30 days (720 hours) at 105° C. This means that the ability to function of a gas generator containing the spontaneous ignition agent according to the present invention is guaranteed with certainty even after such a long exposure time to a temperature of 105° C.

The spontaneous ignition agent according to the present invention is preferably used in the form of tablets, pellets or in the form of other lumpy bodies. The tablets may be arranged in various places in the gas generator.

Two embodiments of air bag gas generators, in which the spontaneous ignition agent tablets are arranged in different places, will be explained in greater detail below on the basis of the drawing. In the drawing, FIGS. 2 and 3 show sections through two different embodiments of the gas generator in a partial representation.

Figure 2:
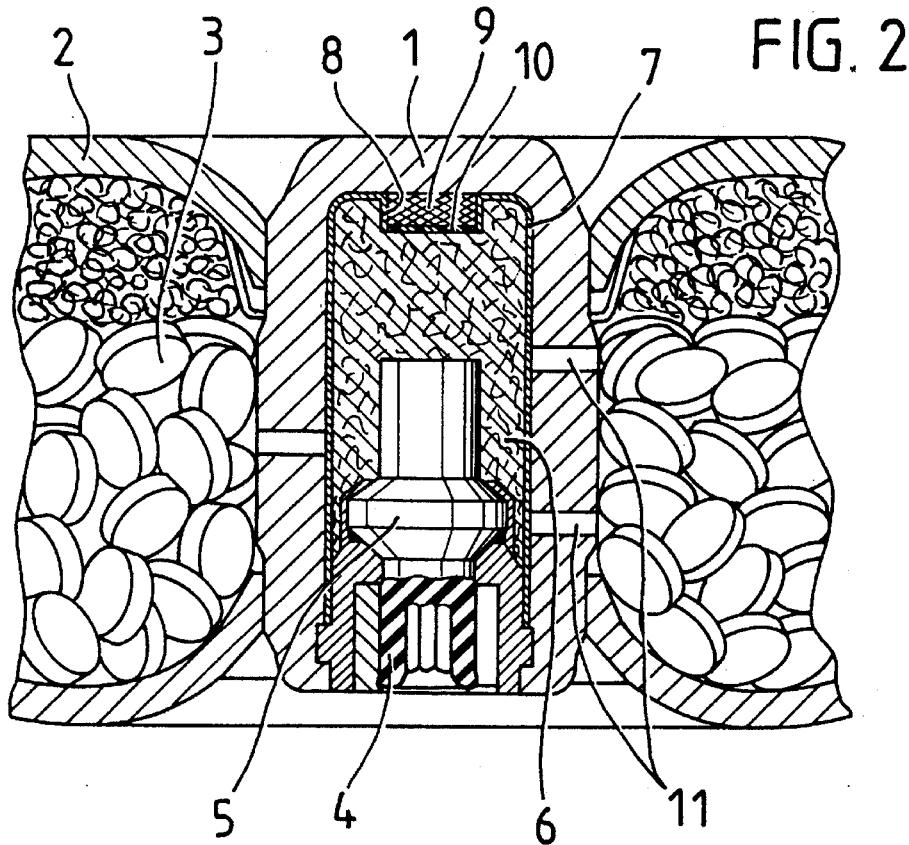
FIG. 2 is a cross sectional view showing the positioning of the spontaneous ignition agent according to one embodiment of the invention.

According to FIG. 2, the gas generator has a central tube 1, around which a toroidal combustion chamber housing 2 filled with propellant pellets 3 extends. An electrical igniter 5 is mounted in the central tube 1 on the igniter support 4, and the igniter 5 extends into a booster charge 6, which is arranged in a sleeve 7. At its front side facing away from the igniter 5, the sleeve 7 is provided with a depression 8, in which the spontaneous ignition agent, designed as, i.e. in the form of, a tablet 9, is arranged. The bottom 10 of the depression 8 is designed as a bursting membrane. The interior of the central tube 1 is connected to the interior of the combustion chamber housing 2 through channels 11.

Spontaneous ignition of the spontaneous ignition material 9 occurs in the case of excessive heating of the combustion chamber housing 2 and of the central tube 1, as a result of which ignition of the booster charge 6 takes place after opening of the bursting membrane 10, and the propellant 3 is thus initiated.

Figure 3:
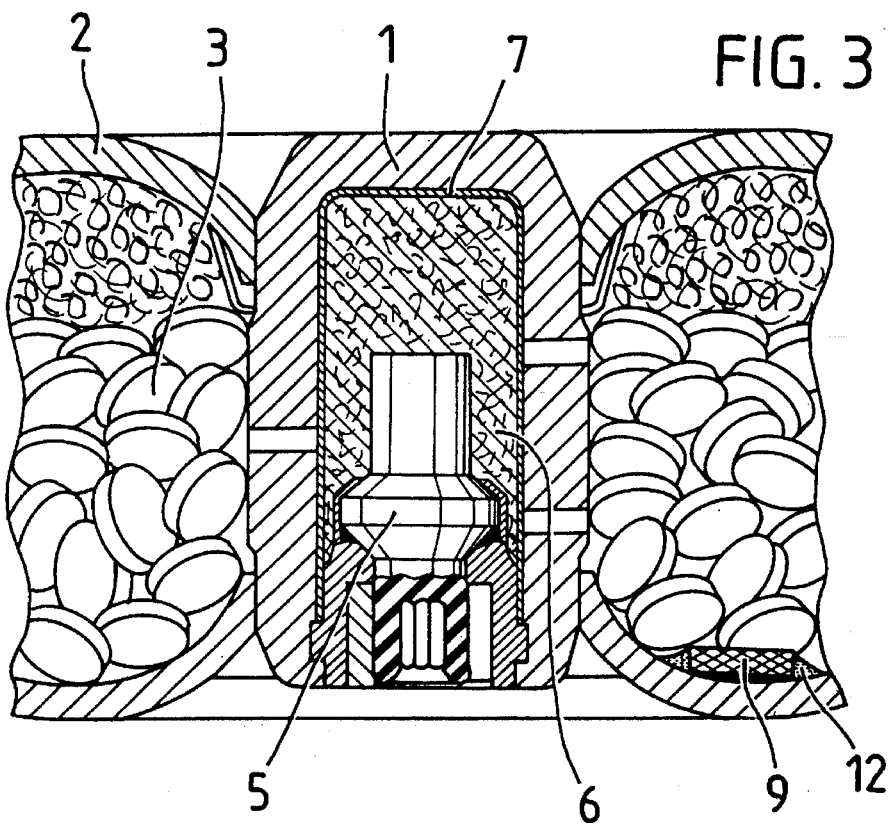
FIG. 3 is a view similar to FIG. 2 showing a different position for the spontaneous ignition agent according to the invention.

The embodiment of the gas generator according to FIG. 3 differs from that according to FIG. 2 only in that the spontaneous ignition agent, designed as the tablet 9, is attached to the inside of the combustion chamber housing by means of a suitable adhesive 12.

Spontaneous ignition of the spontaneous ignition agent 9 takes place in the case of excessive heating of the combustion chamber housing 2, so that the propellant 3 is ignited.

The booster charge 6 and the electrical igniter 5 are also initiated by the combustion of the propellant, so that the gas generator is completely inert after the end of the combustion.

The embodiment according to FIG. 3 with the spontaneous ignition agent tablet arranged on the inside of the combustion chamber housing is especially suitable for long tubular generators as well, because if the spontaneous ignition agent is arranged in such a tubular generator (only) at the igniting unit, which extends axially into the tubular combustion chamber housing from a front side, the spontaneous ignition agent will not be ignited when the combustion chamber housing is heated only on the side facing away from the igniting unit. However, if a plurality of spontaneous ignition agent tablets are attached distributed on the inner wall of the combustion chamber housing, the air bag is released even in the case of only local heating of the housing.

While specific embodiments of the invention have been shown and described in detail to illustrate the application of the principles of the invention, it will be understood that the invention may be embodied otherwise without departing from such principles.

What is claimed is:

1. Air bag gas generator, comprising:

a propellant;

an ignitor with ignitor charge; and a spontaneous ignition agent which ignites at a temperature that is markedly higher than a normal ambient temperature but substantially lower than an ignition temperature of said propellant, said spontaneous ignition agent comprising;

a mixture of nitrocellulose, an inorganic oxidizing agent, carbon as fuel for the inorganic oxidizing agent, wherein a percentage of nitrocellulose ranges from 20 to 70 wt. %, and a percentage of carbon is at least 3 wt. %.

2. Gas generator in accordance with claim 1, wherein:

said percentage of nitrocellulose in the spontaneous ignition agent (9) is 30 to 50 wt. %.

3. Gas generator in accordance with claim 1, wherein:

said percentage of carbon in the propellant is 5 to 20 wt. %.

4. Gas generator in accordance with claim 2, wherein:

said percentage of carbon in the propellant is 5 to 20 wt. %.

5. Gas generator in accordance with claim 1, wherein:

said oxidizing agent is an alkali or alkaline-earth nitrate, chlorate, perchlorate, or peroxide.

6. Gas generator in accordance with claim 1, wherein:

said oxidizing agent is potassium nitrate, and the percentage of potassium nitrate relative to the mixture of potassium nitrate, carbon and the other fuel is 70 to 85 wt. %.

7. Gas generator in accordance with claim 1, wherein:

said spontaneous ignition agent is in the form of a tablet.

8. Gas generator in accordance with claim 6, in combination with a gas generating combustion chamber housing having an inside portion with said propellant located therein, wherein:

said spontaneous ignition agent is located on said inside portion of said combustion chamber housing.

9. Air bag gas generator comprising a propellant, and an igniter with ignitor charge, and a heat stable spontaneous ignition agent which ignites at a temperature that is markedly higher than normal ambient temperature but substantially lower than the ignition temperature of the propellant, the spontaneous ignition agent comprising an intimate mixture of nitrocellulose, an inorganic oxidizing agent and carbon as fuel for the inorganic oxidizing agent, wherein the nitrocellulose is present in an amount by weight of about 20 to 70% and the carbon is present in an amount by weight of at least about 3%, and the spontaneous ignition agent is heat stable to about 105° C. and the inorganic oxidizing agent is an alkali or alkaline earth nitrate, chlorate, perchlorate or peroxide.

10. Gas generator of claim 9 wherein the inorganic oxidizing agent is potassium nitrate.

11. Gas generator of claim 9 further comprising another fuel for the inorganic oxidizing agent, wherein sulfur or an organic compound is present as said another fuel.

12. Gas generator of claim 11 further comprising another fuel for the inorganic oxidizing agent, wherein the organic compound present as said another fuel is sugar or cellulose.

* * * * *